United States Patent
Aiba

(10) Patent No.: US 8,786,774 B2
(45) Date of Patent: Jul. 22, 2014

(54) VIDEO CONTROL DEVICE AND VIDEO CONTROL METHOD

(71) Applicant: JVC Kenwood Corporation, Yokohama (JP)

(72) Inventor: Hideki Aiba, Moriya (JP)

(73) Assignee: JVC Kenwood Corporation, Yokohama-Shi, Kanagawa (JP)

(*) Notice: Subject to any disclaimer, the term of this patent is extended or adjusted under 35 U.S.C. 154(b) by 0 days.

(21) Appl. No.: 13/766,132

(22) Filed: Feb. 13, 2013

(65) Prior Publication Data
US 2013/0176485 A1    Jul. 11, 2013

Related U.S. Application Data

(63) Continuation of application No. PCT/JP2011/067149, filed on Jul. 27, 2011.

(30) Foreign Application Priority Data

Aug. 20, 2010  (JP) ................. 2010-184891

(51) Int. Cl.
| | |
|---|---|
| *H04N 7/01* | (2006.01) |
| *H04N 11/20* | (2006.01) |
| *H04N 5/00* | (2011.01) |
| *H04N 3/14* | (2006.01) |
| *H04N 7/12* | (2006.01) |
| *H04N 11/02* | (2006.01) |
| *H04N 11/04* | (2006.01) |

(52) U.S. Cl.
USPC .......... 348/441; 348/447; 348/497; 348/607; 348/790; 375/240.16

(58) Field of Classification Search
USPC .......... 348/441, 790, 607, 447, 497; 375/240.16
See application file for complete search history.

(56) References Cited

U.S. PATENT DOCUMENTS

| | | | | |
|---|---|---|---|---|
| 5,708,453 A | * | 1/1998 | Tsuchida et al. | 345/87 |
| 2003/0091112 A1 | * | 5/2003 | Chen | 375/240.15 |

(Continued)

FOREIGN PATENT DOCUMENTS

| | | |
|---|---|---|
| JP | 63-182695 A | 7/1988 |
| JP | 05-113767 A | 5/1993 |

(Continued)

OTHER PUBLICATIONS

Kurita, T., Fundamental Deterioration of Picture Quality for Moving Images Displayed on LCDs and Methods for Improvement, Technical Report of IEICE,EID2000-47, pp. 13-18, (Sep. 2000).

(Continued)

*Primary Examiner* — Brian Yenke
(74) *Attorney, Agent, or Firm* — Nath Goldberg & Meyer; Jerald L. Meyer

(57) ABSTRACT

A first quantization unit quantizes data of each pixel constituting a first frame data by a first logical formula to generate a second frame data with a predetermined number of lower bits deleted. A delay memory temporarily holds the second frame data and outputs third frame data. Interpolation unit generates interpolated frame data located between adjacent frames in the second frame data by using the second frame data and the third frame data. A second quantization unit quantizes data of each pixel constituting the first frame data by a second logical formula different from the first logical formula to generate a fourth frame data with a predetermined number of lower bits deleted. A frame memory temporarily holds the fourth frame data and the interpolated frame data, and outputs the fourth frame data and the interpolated frame data alternately at a second frame rate higher than the first frame rate.

10 Claims, 13 Drawing Sheets

(56) References Cited

U.S. PATENT DOCUMENTS

| | | |
|---|---|---|
| 2005/0073630 A1* | 4/2005 | Chen et al. .................. 349/87 |
| 2006/0280249 A1* | 12/2006 | Poon .................. 375/240.16 |
| 2007/0297513 A1* | 12/2007 | Biswas et al. ........... 375/240.16 |
| 2008/0170161 A1* | 7/2008 | Ogino et al. .................. 348/699 |
| 2009/0109290 A1* | 4/2009 | Ye et al. .................. 348/155 |
| 2009/0140965 A1* | 6/2009 | Ishiguchi et al. .............. 345/87 |
| 2009/0278869 A1* | 11/2009 | Oishi et al. .................. 345/691 |
| 2010/0001989 A1* | 1/2010 | Okumura et al. ............. 345/214 |
| 2010/0289928 A1* | 11/2010 | Yano .................. 348/241 |
| 2010/0328530 A1* | 12/2010 | Hashimoto et al. ........... 348/459 |
| 2011/0235707 A1* | 9/2011 | Kobayashi .............. 375/240.03 |
| 2012/0288005 A1* | 11/2012 | Shishido et al. ......... 375/240.16 |
| 2013/0076985 A1* | 3/2013 | Shishido et al. ............. 348/700 |
| 2013/0155129 A1* | 6/2013 | Park et al. .................. 345/699 |

FOREIGN PATENT DOCUMENTS

| | | |
|---|---|---|
| JP | 2000-310980 A | 11/2000 |
| JP | 2003-58120 A | 2/2003 |
| JP | 2004-355017 A | 12/2004 |
| JP | 2006-337448 A | 12/2006 |
| JP | 2008-096959 A | 4/2008 |

OTHER PUBLICATIONS

Written Report and International Search Report in the counterpart Application No. PCT/JP2011/067149, eight (8) pages.

* cited by examiner

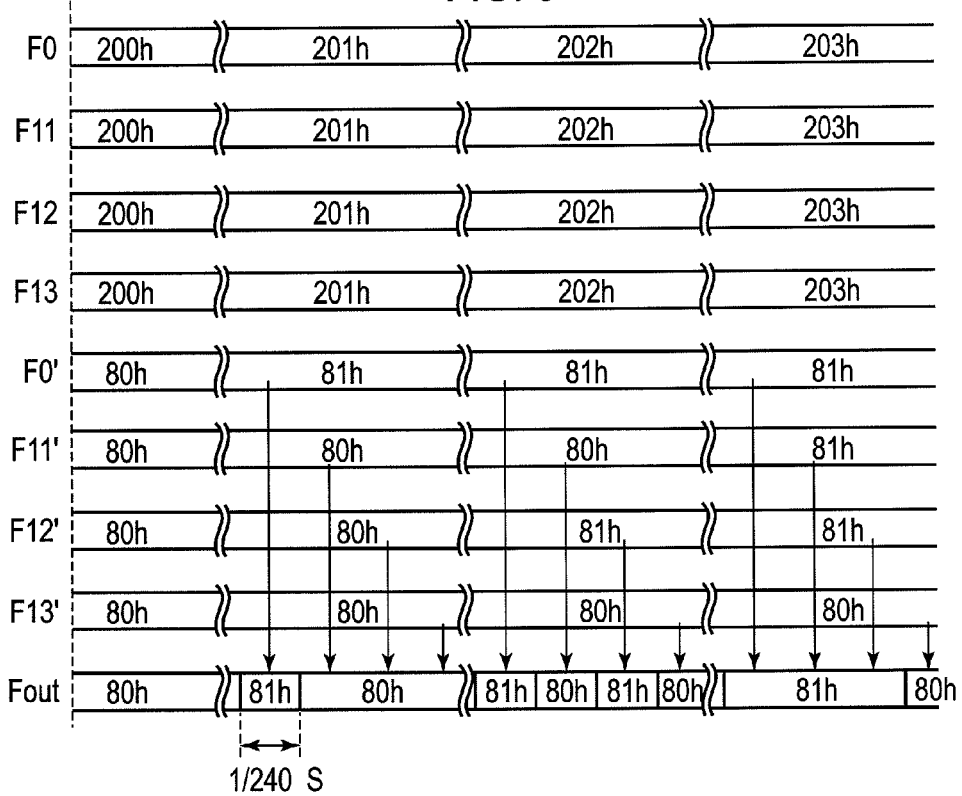
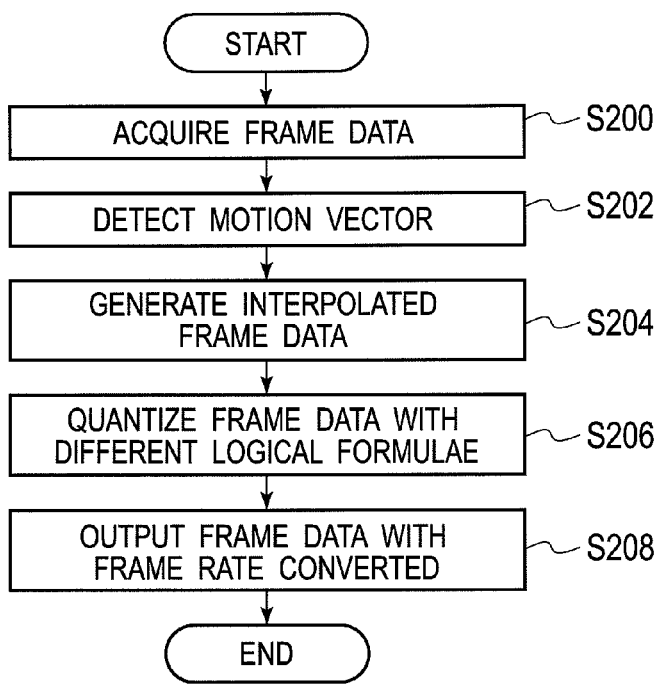

VIDEO CONTROL DEVICE AND VIDEO CONTROL METHOD

CROSS REFERENCE TO RELATED APPLICATION

This application is a continuation of PCT Application No. PCT/JP2011/067149, filed on Jul. 27, 2011, and claims the priority of Japanese Patent Application No. 2010-184891, filed on Aug. 20, 2010, the entire contents of both of which are incorporated herein by reference.

BACKGROUND

The embodiments relate to a video control device and a video control method which change the frame rate.

One type of image display apparatuses included impulse-type display devices represented by display devices using CRTs (cathode-ray tube). An impulse-type display device strongly emits light instantaneously to display an image and causes users to see the light. Another type of image display devices includes hold-type display devices represented by active matrix-type display devices in which each pixel has a memory function. A hold-type display apparatus holds the display state of written image until image of the next frame is written.

As the active matrix-type display devices, liquid-crystal display devices including thin film transistors (TFTs) are known. In a liquid-crystal display device, an image written in pixels is held for a predetermined period of time by TFTs and capacitors provided for the respective pixels.

The liquid-crystal display apparatuses have a problem of degradation of moving images due to the slow response speed thereof as well as blurring in moving image (hereinafter, referred to as moving picture blurring) by the influence of integration in the visual system due to the hold-type display.

As examples of the solution for the problems due to the hold-type display, two methods are proposed: a method of shortening the image hold time to implement display close to the impulse-type display; and a method of multiplying the frame rate of the video signal to a higher rate by using a motion compensation circuit.

These methods are described in Kurita Taiichiro, "Fundamental Deterioration of Picture Quality for Moving Images Displayed on LCDs and Methods for Improvement", Technical Report of IEICE, EID2000-47 (2000-09), p. 13-18.

The former method to implement display closer to the impulse-type display includes problems of reduction in luminance and flicker, and the latter method to increase the frame rate includes problems of complicated converter circuit increasing the frame rate through the motion compensation technique and increasing circuit size. However, in recent years, the latter method is increasingly employed with the progress of the motion compensation technique.

In the latter method, motion vectors are detected from frame data of inputted video signal and frame data of delayed video signal. Based on the detected motion vectors, interpolated frame data corresponding to intermediate image between the aforementioned two sets of frame data are created and are inserted therebetween. The frame rate is thus increased to two times the frame rate at which the data is inputted.

However, for creating frame data and temporarily holding the frame data during the frame-rate conversion of the created frame data, frame memory is required.

By the way, because of the demand for higher image quality in recent years, the number of gradations of video signals is increasing, and there is a demand for display devices that represent each RGB color of each pixel in more than 8-bit gradations.

In the case of LCD devices, a video signal represented by digital gradation is converted to analog voltage through a source driver and supplied to the source electrode. At this time, the solution of the digital-analog converters (DAC) used in the source drivers is usually 6 bits in personal computers and 8 bits in television receivers.

As a method of increasing apparent intermediate gray levels without increasing the resolution of DACs themselves, a FRC (frame rate control) method of rounding up and down some low bits on a frame-basis is often used.

Japanese Patent Laid-open Publication No. 5-113767 discloses a technique to increase apparent intermediate gray levels using dithering for frame data after the frame rate is doubled instead of increasing the spatial resolution of the pixels.

SUMMARY

If the number of bits of data is increased to increase the number of gray levels of video signal in response to the demand for higher image quality and rate increasing converters are employed, the capacity of the frame memory and the number of terminals thereof increase, and the data throughput (band width) between the frame memory and the memory control circuit controlling the frame memory increases.

Furthermore, the increase in number of terminals of the frame memory increases the package cost. If the band width is increased to increase the data speed, an increase in power increases the cost for measures against heat generation and the power supply circuit. On the other hand, there is a strong demand for cheaper LCD devices. Accordingly, it is necessary to implement a rate increasing converter at lower cost.

In the light of the aforementioned problems, an object of the embodiments is to provide a video control device and a video control method which are capable of reducing moving picture blurring due to the hold-type display and increasing the number of gray levels without casually increasing the number of bits (bit length) at a cost prevented from increasing.

In order to solve the aforementioned problems, a first aspect of the embodiments provides a video control device, comprising: a data acquisition unit configured to acquire first frame data having a first frame rate; a first quantization unit configured to quantize data of each pixel constituting the first frame data by a first logical formula to generate a second frame data with a predetermined number of lower bits deleted; a delay memory configured to temporarily hold the second frame data and output third frame data obtained by delaying the second frame data; one or a plurality of interpolation units configured to generate one or a plurality of sets of interpolated frame data located between adjacent frames in the second frame data by using the second frame data and the third frame data; one or a plurality of second quantization units configured to quantize data of each pixel constituting the first frame data or the interpolated frame data by a second logical formula different from the first logical formula to generate a fourth frame data with a predetermined number of lower bits deleted; a frame memory configured to temporarily hold the fourth frame data and the interpolated frame data; and a frame controller configured to control reading of the fourth frame data and the interpolated frame data from the frame memory to repeatedly output the fourth frame data and the interpolated frame data sequentially from the frame memory at a second frame rate higher than the first frame rate.

A second aspect of the embodiments provides a video control device comprising: a data acquisition unit configured to acquire first frame data having a first frame rate; a delay memory configured to temporarily hold the first frame data and output second frame data obtained by delaying the first frame data; one or a plurality of interpolation units configured to generate one or a plurality of sets of interpolated frame data located between adjacent frames in the first frame data by using the first frame data and the second frame data; a plurality of quantization units configured to quantize data of each pixel of the first frame data and data of each pixel of the second frame data with different logical formulae and generate third frame data with a predetermined number of bits deleted; a frame memory configured to temporarily hold the third frame data; a frame controller configured to control reading of the fourth frame data from the frame memory to cause the fourth frame data to repeatedly output sequentially from the frame memory at a second frame rate higher than the first frame rate; and an alternating signal generating unit configured to alternately output a first signal and a second signal, which is obtained by inverting the first signal, in accordance with the first frame rate; wherein the quantization units each have $2^L$ logical formulae where L is a positive integer and changes the logical formulae according to the first and second signals.

A third aspect of the embodiments provides a video control method, comprising: acquiring first frame data having a first frame rate; quantizing data of each pixel constituting the first frame data by a first logical formula to generate a second frame data with a predetermined number of lower bits deleted; temporarily holding the second frame data and outputting third frame data obtained by delaying the second frame data; generating one or a plurality of sets of interpolated frame data located between adjacent frames in the second frame data by using the second frame data and the third frame data; quantizing data of each pixel constituting the first frame data or the interpolated frame data by a second logical formula different from the first logical formula to generate a fourth frame data with a predetermined number of lower bits deleted; and temporarily holding the fourth frame data and the interpolated frame data in a frame memory and repeatedly outputting the fourth frame data and the interpolated frame data sequentially from the frame memory at a second frame rate higher than the first frame rate.

BRIEF DESCRIPTION OF THE DRAWINGS

FIG. 6 is an explanatory diagram for explaining still another example of the video control device.

FIG. 7 is a flowchart illustrating the entire sequence of a video control method.

DETAILED DESCRIPTION

Figure 1:
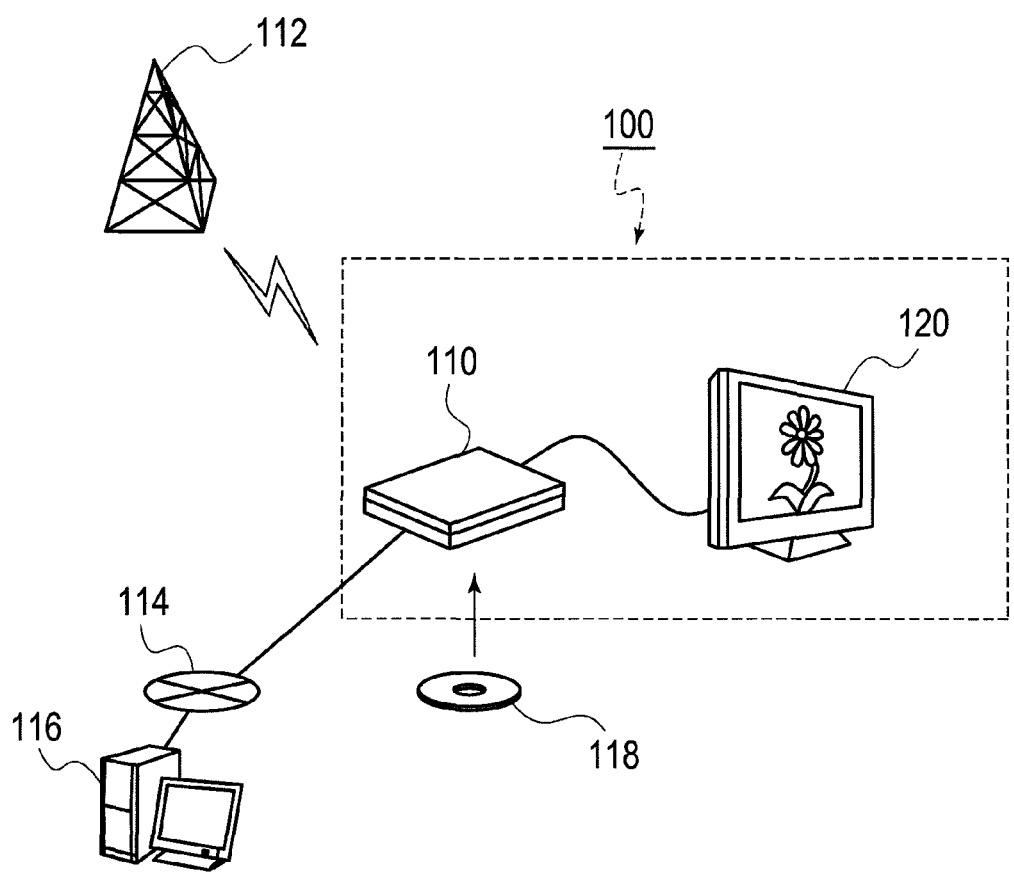
FIG. 1 is an explanatory view illustrating a schematic relationship among devices constituting a display system.

Hereinbelow, with reference to the attached drawings, a description is given of preferred embodiments in detail. The dimensions, materials, and other concrete numerical values shown in the embodiments will not limit the present invention unless otherwise specified.

In the specification and drawings, elements having substantially same functions and configurations are given same reference numerals or symbols, and overlapping description thereof is omitted. Moreover, the drawings do not show elements not directly related to the present invention.

(Display System 100)

FIG. 1 is an explanatory view showing the schematic relationship among devices constituting a display system 100. The display system 100 includes a video control device 110 and a liquid crystal display device 120.

The video control device 110 acquires video signal from a broadcast station 112 through airwaves, a server device 116 through a communication network 114 such as the Internet, a LAN, or a dedicated line, or a storage medium 118 such as a DVD, a BD (Blu-ray disc), a USB memory. The video control device 110 converts the frame rate of the acquired video signal and transmits the same to the liquid crystal display device 120.

The liquid crystal display device 120 includes a predetermined number of pixels arranged in a matrix. A frame refers to one image constituting video in the video signal and an image of a screen displayed by the pixels arranged in the matrix fashion in the liquid crystal display device 120. Image data of one image of a screen is referred to as frame data. The frame rate is the number of frames updated per unit time.

The liquid crystal display device 120 is composed of a liquid crystal composition sealed between two glass plates and displays the video signal with the frame rate converted by the video control device 110.

Hereinafter, the functional blocks constituting the video control device 110 are individually described, and then, the video control method using the video control device 110 is described in detail.

(First Embodiment: Video Control Device 110)

Figure 2:
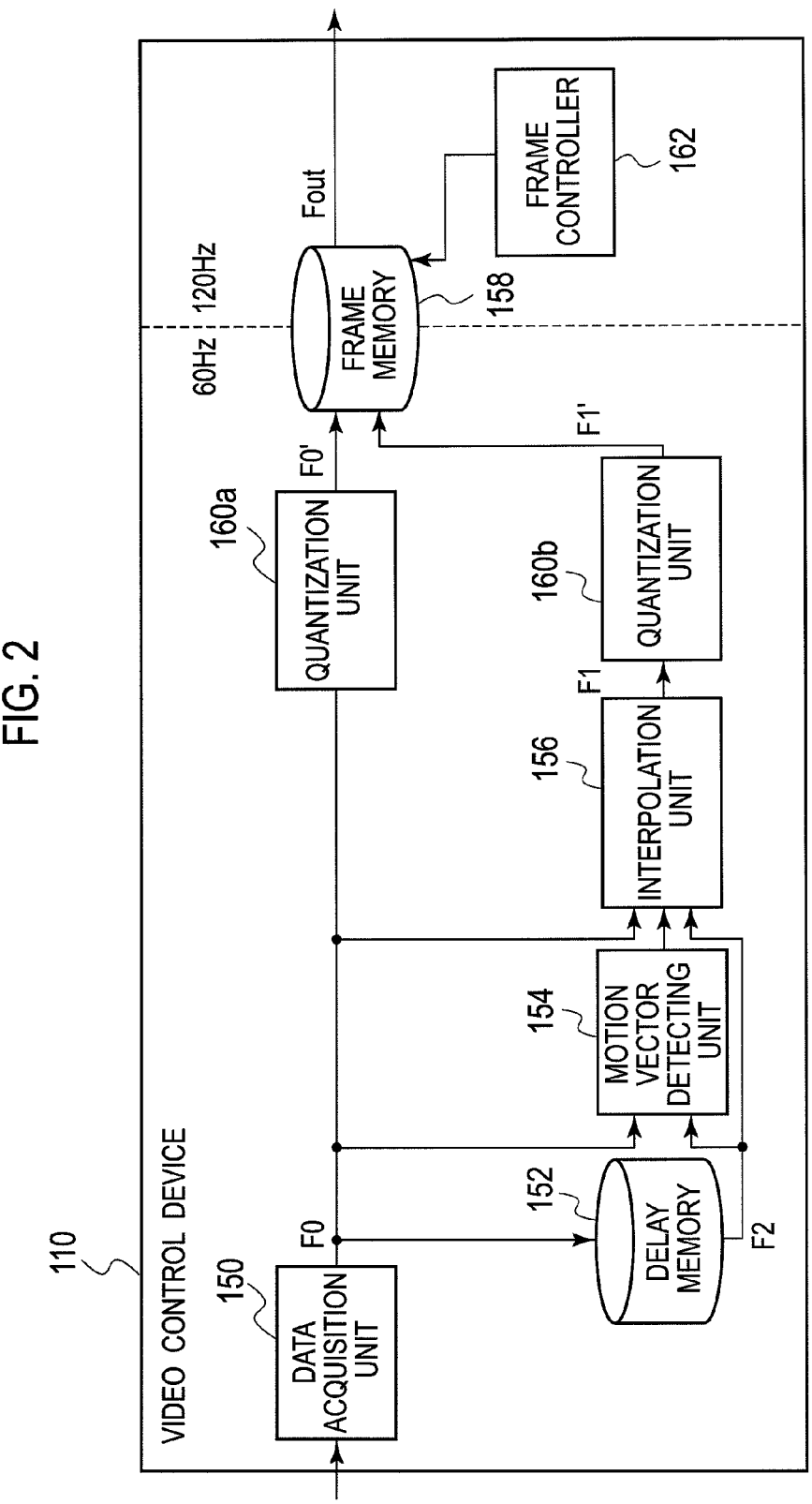
FIG. 2 is a functional block diagram schematically illustrating the functions of a video control device in a first embodiment.

FIG. 2 is a functional block diagram schematically illustrating the functions of the video control device 110 of the first embodiment. As shown in FIG. 2, the video control device 110 includes a data acquisition unit 150, a delay memory 152, a motion vector detecting unit 154, an interpolation unit 156, a frame memory 158, quantization units 160a and 160b, and a frame controller 162. The quantization units 160a and 160b and later-described quantization units 160c and 160d are collectively referred to as quantization units 160 in some cases.

The data acquisition unit 150 acquires frame data (first frame data) at a first frame rate (60 Hz, for example) and outputs the same to the delay memory 152, motion vector detecting unit 154, interpolation unit 156, and quantization unit 160*a*.

Herein, for convenience of explanation, the latest frame data acquired by the data acquisition unit 150 is referred to as frame data F0.

The delay memory 152 is composed of a RAM such as a SDRAM. The delay memory 152 temporarily holds the frame data F0 and outputs the same as past frame data before the frame data F0 (herein, previous frame period). The frame data one frame before the latest frame data F0 (second frame data), which is outputted from the delay memory 152, is referred to as frame data F2. The frame data F2 is supplied to the motion detecting unit 154 and interpolation unit 156.

The motion vector detecting unit 154 detects motion vectors based on the frame data F0 and the frame data F2 outputted from the delay memory 152. The process to detect the motion vectors can be implemented by any one of existing various techniques, and the detailed description thereof is omitted.

The interpolation unit 156 creates interpolated frame data F1 which is to be located between the frame data F0 and the frame data F2 based on the motion vectors detected by the motion vector detecting unit 154.

This embodiment shows an example of a double frame rate in which data of one frame is inserted within a period of 1/60 seconds as a frame period. In this case, it is necessary to provide one interpolation unit 156.

For example, in the case of a quadruple frame rate, three sets of frame data are interpolated in one frame period, and it is necessary to provide at least three interpolation units 156. In the case of an 8-fold frame rate, seven sets of frame data are interpolated in one frame period, and it is necessary to provide at least seven interpolation units 156.

One or plural sets of interpolated frame data F1 are arranged temporally equally between the frame data F0 and frame data F2, and the position of a subject on the interpolated frame data set F1 is linearly interpolated in accordance with the motion vectors.

By the way, human's eyes have features of feeling light integrated over a predetermined time as brightness (integration in the visual system). When a human-being sees an image on the hold-type display device that holds the display state on a frame-basis, moving picture blurring occurs at the edge in the image in some cases.

The interpolation unit 156 inserts one or plural sets of interpolated frame data between the sets of frame data to multiply the frame rate (double the same herein). By the video control device 110, therefore, it is possible to shorten the frame period to reduce moving picture blurring without changing the brightness and avoid the problem of flicker.

The frame memory 158 is composed of a RAM such as a SDRAM similarly to the delay memory 152. The frame memory 158 temporarily holds frame data F0', which is obtained by quantizing the frame data F0 by the quantization unit 160*a*, and interpolated frame data F1', which is obtained by quantizing the interpolated frame data F1 by the quantization unit 160*b*. The operation of the frame controller 162 is described later.

The delay memory 152 and frame memory 158 are controlled for arbitration by a dedicated controller so that data reading and data writing are not conflicted.

For example, in the case where the data acquisition unit 150 acquires frame data composed of 9-bit pixel data, if the frame data of 9-bit pixel data is just stored in the frame memory 158 with the pixel data of 9 bits unchanged, the capacity of the frame memory 158 needs to be increased.

Many memories handle data in 8-bit units (1 byte). Even if the data length thereof is increased by only 1 bit to 9 bits, the 9-bit data occupies a region of 16 bits (2 bytes), for example.

The memory capacity then becomes insufficient, and it is necessary to add a frame memory. Adding 1 bit increases the transfer rate of the frame data, causes shortage of the data throughput, and requires additional frame memory.

The delay memory 152 and frame memory 158 are controlled by a dedicated controller as described above. Accordingly, with an increase in the number of bits, the number of terminals through which data and addresses are transmitted and received increases, thus leading to an increase in package cost.

Furthermore, the increase in data throughput between the memory control circuit controlling the frame memory 158 and the frame memory 158 increases the power and the cost for measures against heat generation and the power circuit.

In the first embodiment, accordingly, a predetermined number of lower bits of pixel data of the frame data F0 and interpolated frame data F1 are quantized by the quantization units 160 described below prior to being recorded in the frame memory 158. For example, the quantization units 160 convert 9-bit data to 8-bit data, and the frame memory 158 holds 8-bit data.

In such a way, the frame data to be stored in the frame memory 158 can be composed of pixel data in 8-bit units (1-byte units). According to the first embodiment, it is possible to prevent the manufacturing cost from increasing by casually increasing the number of bits.

According to the first embodiment, moreover, it is possible to prevent an increase in data throughput to the frame memory. Accordingly, it is possible to prevent an increase in power and prevent an increase in cost for measures against heat generation and the power supply circuit with increasing power.

The quantization units 160*a* and 160*b*, respectively, quantize data of each pixel of the frame data F0 and data of each pixel of the interpolated frame data F1 by using logical formulae different from each other and delete a predetermined number of lower bits.

The number of the quantization units 160 in total is at least $2^M$ where M is the predetermined number of lower bits to be deleted (M is an integer). When the frame data F0 is composed of 9-bit pixel data and the frame memory 158 holds the frame data F0' and the interpolated frame data F1' in 8-bit units after a lower 1 bit of the pixel data is deleted, at least $2^1$ quantization units 160 are necessary. The number of quantization units 160 in total is two, the quantization units 160*a* and 160*b*.

The quantization units 160*a* and 160*b* quantize the pixel data of the inputted frame data F0 and frame data F1 by using different logical formulae, respectively. The logical formulae of the quantization units 160*a* and 160*b* differ from each other in terms of the conditions for rounding up of bits.

Specifically, the quantization units 160*a* and 160*b* quantize pixel data using different logical formulae according to the values of lower bits (a predetermined number of bits from the LSB (least significant bit)) of the pixel data to be deleted and finally delete the lower bits.

For example, in the case of deleting lower 1 bit of 9-bit pixel data, the quantization unit 160*a* rounds up the lower 1 bit, and the quantization unit 160*b* discards the lower 1 bit. When the lower 1 bit is 0, even if the quantization unit 160*a* rounds up the lower 1 bit, the lower 1 bit is not rounded up actually, which is the same as being discarded.

When the lower 1 bit is 1, the quantization unit 160a rounds up the lower 1 bit, and the quantization unit 160b discards the lower 1 bit.

The quantization unit 160a only needs to perform the process of carrying the value of the lower 1 bit to the higher-order bit, and the quantization unit 160b only performs of discarding the lower 1 bit irrespectively of the value of the lower 1 bit.

In the case where the pixel data of the frame data F0 or the pixel data of the interpolated frame data F1 is "1FFh", which is the maximum value in 9-bit data, overflow occurs when "1" is added to any bit. In this case, the quantization unit 160a performs a limiting process to fix the pixel data to "1FFh".

Herein, the suffix "h" indicates that the value is given in hexadecimal, and numeric values without the suffix "h" are binary. In the following, the numeric values are given in these formats.

Figure 3A:
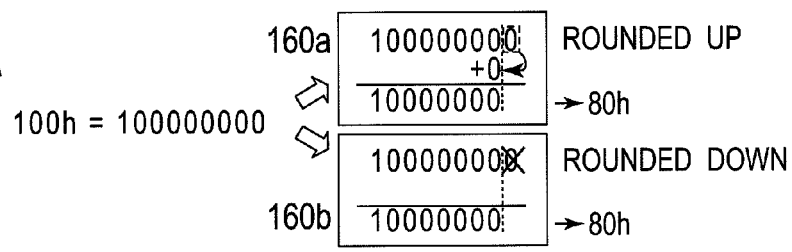
FIGS. 3A and 3B are explanatory views for explaining the operation of quantization units in detail.
Figure 3B:
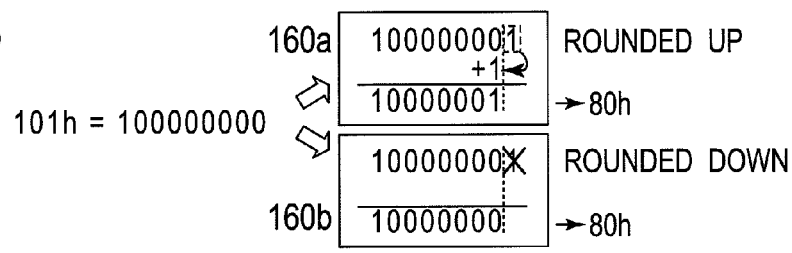

FIGS. 3A and 3B are explanatory views for explaining the operation of the aforementioned quantization units 160 in detail.

For example, when the pixel data of frame data is "100h" in 9 bits with the lower 1 bit being "0", the quantization unit 160a carries "0" to the higher-order bit. In this case, since the lower 1 bit is "0", the carry-over operation is equal to the discarding operation. Accordingly, the pixel data becomes "80h" in 8 bits.

The quantization unit 160b discards the lower 1 bit irrespectively of the value of the lower 1 bit. The pixel data therefore becomes "80h" in 8 bits.

As shown in FIG. 3B, when pixel data of frame data is "101h" in 9 bits with the lower 1 bit being 1, the quantization unit 160a carries the lower 1 bit to the higher-order bit, that is, the second lower bit and uses the sum thereof as new frame data.

Similarly to the case where the lower 1 bit is "0", the quantization unit 160b discards the lower 1 bit irrespectively of the value thereof.

Accordingly, the pixel data are "81h" and "80h" in 8 bits.

As described above, the quantization units 160 replace lower n bits of frame data at an arbitrary time, lower 1 bit herein, with higher-order bits for the purpose of higher frame rate processing for FRC process.

Herein, it is assumed that the frame data inputted into the quantization unit 160a has the same value as that inputted into the quantization unit 160b. When the lower 1 bit of 9-bit pixel data is "0", converting the 9-bit pixel data to 8-bit data (removing the lower 1 bit) has no effect. When 9-bit pixel data with the lower 1 bit being "1" is converted to 8-bit data, "1" is added to the new lower bit (the second lower bit before conversion) of the frame data of the quantization units 160a and is not added to the new lower bit of the frame data of the quantization unit 160b.

The frame data obtained by quantizing the frame data F0 and the frame data obtained by quantizing the interpolated frame data F1 are alternately outputted continuously with time. The user then recognizes "0" and "1" of the LSBs visually mixed with time. The temporal average thereof is perceived as if there were an intermediate gray level between the same.

Figure 4:
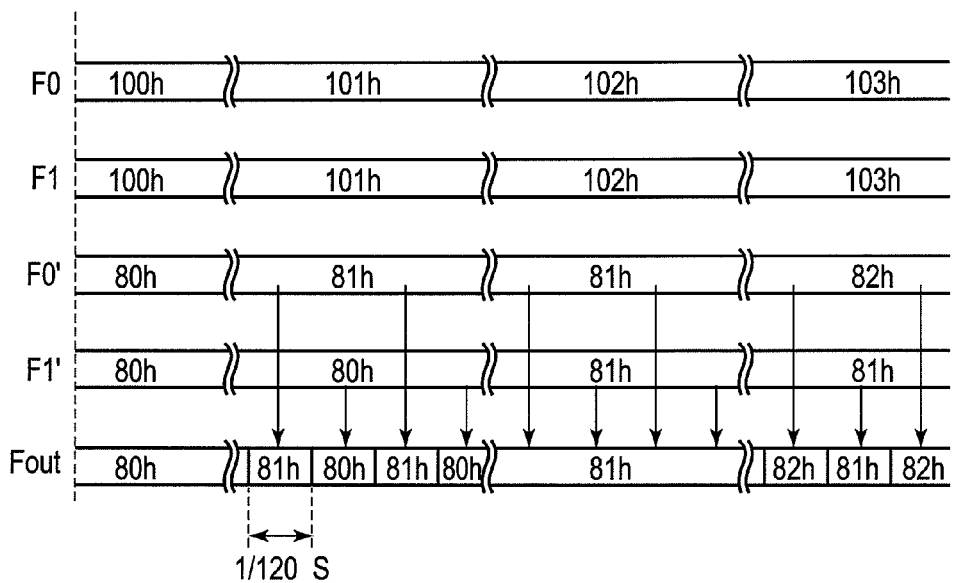
FIG. 4 is an explanatory view for explaining temporal change in data quantized by the quantization units.

FIG. 4 is a diagram for explaining temporal changes in data quantized by the quantization units 160. When pixel data of frame data is composed of 9 bits, the frame data F0 and the interpolated frame data F1 are both composed of 9-bit data.

Herein, when the frame data F0 and the interpolated frame data F1 are both "100h", the lower bits thereof are "0". The quantization unit 160a carries the lower bit "0" and outputs "80h" as the frame data F0'. The quantization unit 160b discards the lower bit "0" and outputs "80h" as the interpolated frame data 1'. "80h" is a half of "100h".

At this time, as described later, as the frame data Fout, in which the frame data F0' and the interpolated frame data F1' are alternately outputted at the frame rate converted on a predetermined time unit basis, "80h" is successively outputted from the frame memory 158.

When the frame data F0 and the interpolated frame data F1 are both "101h", the lower bits thereof are "1". The quantization unit 160a carries the lower bit "1" to the higher-order bit and outputs "81h" as the frame data F0'. The quantization unit 160b discards the lower bit "1" and outputs "80h" as the interpolated frame data F1'.

At this time, as the frame data Fout, in which the frame data F0' and the interpolated frame data F1' are alternately outputted on a predetermined time unit basis from the frame memory 158, "81h" and "80h" are alternated as shown in FIG. 4.

The user alternately sees the "81h" and "80h" at 120 Hz to visually sense the same as "80.8h" which is an average for 1/60 seconds. This corresponds to a half of "101h" in 9 bits.

When the frame data F0 and the interpolated frame data F1 created by the interpolation unit 156 are both "102h", the lower bits thereof are "0". Similarly to the case of "100h", the quantization unit 160a carries the lower bit "0" to the higher-order bit, and the quantization unit 160b discards the lower bit "0". Both the quantization units 160a and 160b output "81h".

At this time, as the frame data Fout, in which the frame data F0' and the interpolated frame data F1' are alternately outputted on a predetermined time unit basis from the frame memory 158, "81h" is successively outputted.

When the frame data F0 and the interpolated frame data F1 are both "103h", in the frame data Fout, which is alternately outputted on a predetermined time unit basis from the frame memory 158, "82h" and "81h" are alternated.

The user alternately sees the "82h" and "81h" at 120 Hz to visually sense the same as "81.8h", which corresponds to a half of "103h" in 9 bits.

In the first embodiment, based on the premise of execution of the frame-rate increasing process using the interpolation unit 156, the FRC process is applied to the frame data whose frame rate is converted to a higher rate to represent the lower bit, which is deleted by quantization, by the higher-order bits of plural frames (herein, two frames in the frame data Fout).

Accordingly, in the first embodiment, it is possible to express gray levels equivalent to those of 9-bit pixel data although the number of bits is compressed to 8 bits.

Although the FRC process is performed, the frame-rate increasing process is simultaneously performed, so that the moving picture blurring does not occur, and the problem of flicker can be avoided.

Figure 5:
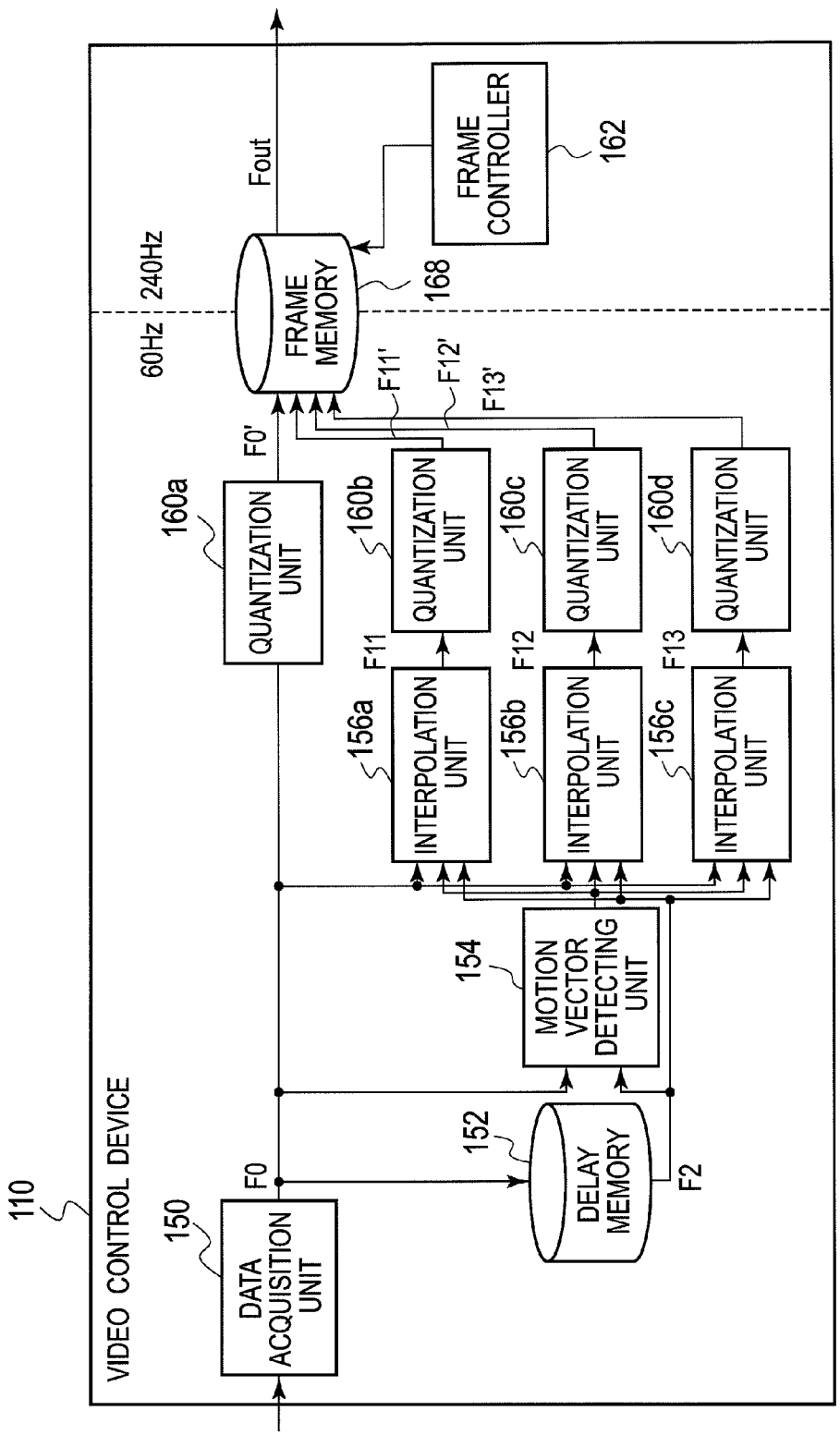
FIG. 5 is an explanatory diagram for explaining another example of the video control device.

FIGS. 5 and 6 are explanatory view for explaining another example of the video control device 110. The video control device 110 shown in FIG. 5 includes three interpolation units 156a, 156b, and 156c and four quantization units 160a, 160b, 160c, and 160d.

The interpolation units 156a to 156c are collectively referred to as interpolation units 156 in some cases. The quantization units 160a to 160d and a later-described quantization unit 160e are collectively referred to as quantization units 160 in some cases.

The video control device 110 is capable of quadrupling the frame rate of 60 Hz, that is, converting to 240 Hz through the three interpolation units 156a to 156c. Accordingly, the number of bits can be reduced by 2 bits ($=\log_2 4$) by the quantization units 160.

The four quantization units 160a to 160d quantize pixel data of the frame data F0 and plural sets of interpolated frame data F11 to F13 by using logical formulae different from one another. The quantization units 160a outputs a quantized frame data F0', and the quantization units 160b to 160d output quantized interpolated frame data F11' to F13', respectively.

Specifically, the quantization units 160a to 160d, respectively, add different numerals "11", "01", "10", and "00" to the lower 2 bits and delete the lower 2 bits.

The number of the quantization units 160 in total needs to be $2^M$ where M is the predetermined number of deleted lower bits. In order to prevent flicker, the ratio of the second frame rate to the first frame rate, that is, the multiplier of the frame rate is set to at least $2^M$, and $2^M-1$ interpolation units 156 are provided.

For example, in the case of deleting the lower 1 bit before the frame data is held in the frame memory 158, the control device needs two quantization units 160 and one interpolation unit 156 as described above. In the case of deleting the lower 2 bits, the control device needs four quantization units 160 and three interpolation units 156 as described above.

In the case where the video control device 110 shown in FIG. 5 is operated, when the frame data F0 and interpolate frame data F11 to F13 individually change like "200h", "201h", "202h", and then "203h" as shown in FIG. 6, the lower 2 bits thereof change like "0h", "1h", "2h", and then "3h". Although the frame data F0 is 100h in 9 bits in FIG. 4, the frame data F0 herein is relatively "200h" in 10 bits.

As the frame data Fout, in which the frame data F0' and the interpolated frame data F11' to F13' are repeatedly sequentially outputted on a predetermined time unit basis from the frame memory 158, "81h" and "80h" are alternated as shown in FIG. 6.

The user alternately sees the "81h" and "80h" to visually sense the same as "80.0h", "80.4h", "80.8h", and "80.Ch", which are respectively correspond to a fourth of "200h", "201h", "202h", and "203h", as averages for 1/60 seconds.

If the number of bits is casually increased for increasing the number of gray levels, as described above, the memory capacity is increased. Moreover, the power consumption is increased, thus leading to increases in cost for measures against heat generation and cost for the power supply circuit.

According to the first embodiment, the quantization units 160 are provided upstream of the frame memory 158 to compress the number of bits of pixel data of frame data to 8 bits. Accordingly, the number of bits of the frame memory 158 can be reduced.

Moreover, according to the first embodiment, it is possible to reduce the moving picture blurring due to the hold-type display, increase the number of gray levels without casually increasing the number of bits, and therefore prevent an increase in cost by addition of memory. According to the first embodiment, it is possible to prevent an increase in power and prevent an increase in cost for measures against heat generation and the power supply circuit due to increasing power.

In the aforementioned example, the frame data F0 and interpolated frame data F1 (F11, F12, and F13) are the same. Originally, the major object of the frame-rate increasing process by the interpolation units 156 is to process moving picture blurring, and data therefore changes. The first embodiment is sufficient to have an effect just on images with no change or very little change.

This is because, human sense of vision does not require high gradation accuracy while the moving picture is changing severely and requires highly-accurate gradation representation for static or slow motion, that is, for data with no difference or very little difference between the frame data F0 and interpolated frame data F1 (F11, F12, and F13).

The frame controller 162 controls data reading from the frame memory 158 so that the frame data F0' and interpolated frame data F1' or plural sets of interpolated frame data F11', F12', and F13', which are held in the frame memory 158, are repeatedly sequentially outputted at a second frame rate (60 Hz×n), which is a multiple (n times: n is an integer) of the first frame rate (60 Hz).

Under the control to read data from the frame memory 158 by the frame controller 162, the frame data Fout is outputted at 120 Hz from the frame memory 158 in FIG. 2, and the frame data Fout is outputted at 240 Hz from the frame memory 158 in FIG. 5.

In this example, the rate increasing converter doubles or quadruples the frame rate, but is not limited to this, and can multiply the frame rate by $2^K$ times (K is an integer).

When the frame rate is multiplied by $2^K$, K bits can be deleted. Obviously, when the frame rate is multiplied by 8, it is unnecessary to delete three bits, and it can be configured to provide four quantization units 160 to delete only two bits.

The number of deleted bits, the multiplier at frame rate conversion, the arrangement of the quantization units 160 (which quantization logical formula is applied to each set of interpolated flame data), and the like can be freely changed depending on the required specifications, circuit size, and the like by designers.

Japanese Patent Laid-open Publication No. 2006-337448 shows a method of reasonably combining a double speed converter and a time-axis emphasis circuit, and it is effective to combine these techniques with the first embodiment, the detailed description of which is omitted.

Moreover, provided is a program causing a computer to function as the video control device 110 and a computer-readable storage medium, such as a flexible disk, a magneto-optical disk, a ROM, an EPROM, an EEPROM, a CD, a DVD, and a BD, which stores the aforementioned program. Herein, the program refers to a data processing means described in arbitrary language and description format.

(Video Control Method)

Next, a description is given of a video control method controlling video signal using the above-described video control device 110. FIG. 7 is a flowchart showing the entire sequence of the video control method.

The data acquisition unit 150 of the video control device 110 acquires the frame data F0 at the first frame rate (60 Hz) and outputs the same to the delay memory 152, motion vector detecting unit 154, interpolation unit 156, and quantization unit 160a (step S200).

Subsequently, the motion vector detecting unit 154 detects motion vectors based on the frame data F0 and the previous frame data F2 held in the delay memory 152 (step S202).

Based on the motion vectors detected by the motion vector detecting unit 154, the interpolation unit 156 creates one or plural interpolated frame data sets F1, F11, F12, and F13 which are to be located between the frame data F0 and the frame data F2 (step S204).

The plural quantization units 160 quantize the pixel data of the frame data F1 and the one or plural sets of interpolated frame data F1, F11, F12, and F13 using respective different logical formulae and each delete a predetermined number of lower bits to store the same in the frame memory 158 (step S206).

Finally, the frame controller 162 repeatedly outputs the frame data F0 and the one or plural sets of interpolated frame data F1, F11, F12, and F13, which are held in the frame memory 158, sequentially at the second frame rate (60 Hz×n), which is a multiple (n-times) of the first frame rate (60 Hz) (step S208).

According to the aforementioned video control method, it is possible to reduce the moving picture blurring due to the hold-type display while increasing the number of gray levels without casually increasing the number of bits. According to the video control method, it is possible to prevent an increase in capacity of the frame memory and an increase in cost by addition of memory. Furthermore, according to the video control method, it is possible to prevent an increase in power and an increase in cost for measures against heat generation and the power supply circuit due to increasing power.

(Second Embodiment: Video Control Device 310))

In the aforementioned first embodiment, the increase in capacity of the frame memory 158 is avoided by providing the quantization units 160 upstream of the frame memory 158. A second embodiment further focuses on the delay memory 152. In the second embodiment, in a similar manner to the frame memory 158, an increase in capacity of the delay memory 152 can be avoided, in addition to the frame memory 158, by causing the quantization units (upstream quantization units) 160 to quantize the frame data in upstream of the delay memory 152.

Figure 8:
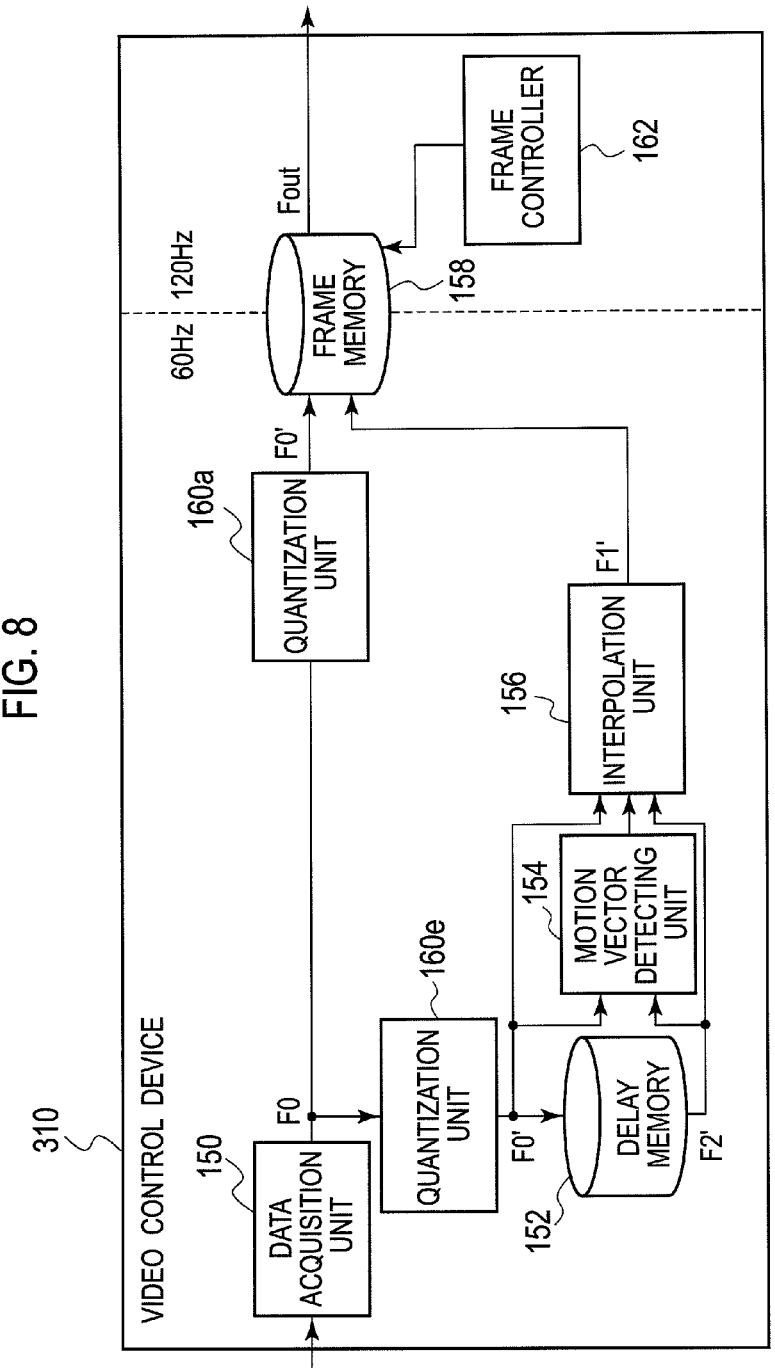
FIG. 8 is a functional block diagram schematically illustrating a video control device of a second embodiment.

FIG. 8 is a functional block diagram schematically illustrating the functions of the video control device 310 in the second embodiment. As shown in FIG. 8, the video control device 310 includes a data acquisition unit 150, a delay memory 152, a motion vector detecting unit 154, an interpolation unit 156, a frame memory 158, quantization units 160a and 160e, and a frame controller 162.

In FIG. 8, the quantization units 160a and 160e function as a downstream quantization unit and an upstream quantization unit, respectively.

The constituent components of the video control device 310 of the second embodiment have the substantially same functions as those previously described in the first embodiment are different in only the connections. The overlapping description is then omitted, and only the constituent components having different connections are mainly described.

In the second embodiment, the quantization unit 160e is provided upstream of the delay memory 152 to compress the number of bits of the frame data F0 acquired by the data acquisition unit 150 when the frame data set F0 is held in the delay memory 152.

In the case where the data acquisition unit 150 acquires frame data composed of 9-bit pixel data, the quantization unit 160e deletes the lower 1 bit, and a frame data F0' composed of pixel data whose number of bits is reduced to 8 bits is held in the delay memory 152.

Figure 9:
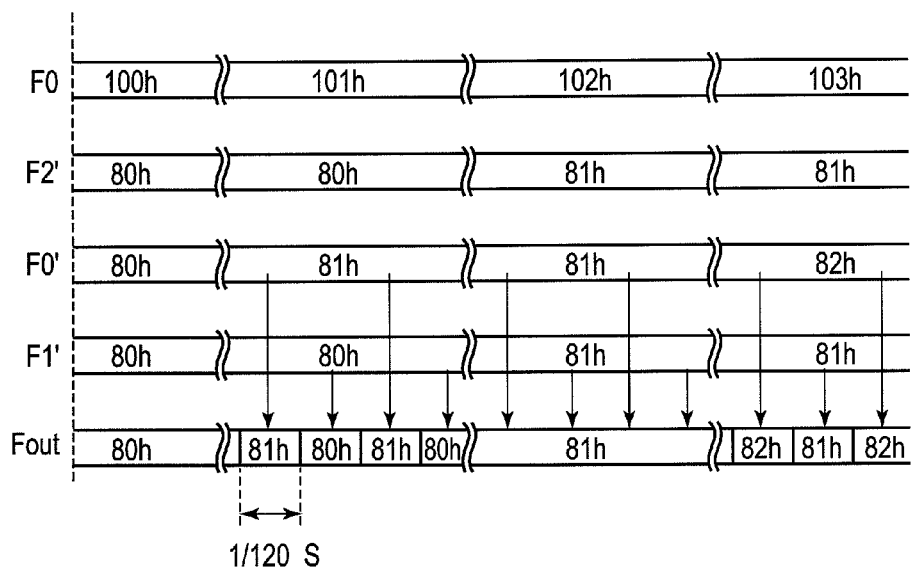
FIG. 9 is an explanatory view for explaining temporal change in data quantized by quantization units.

FIG. 9 is an explanatory view for explaining temporal changes in data quantized by the quantization units 160. The data acquisition unit 150 acquires the frame data F0 composed of 9-bit pixel data. The quantization unit 160e deletes one bit of the frame data F0 and outputs the 8-bit frame data F0'.

In the second embodiment, as shown in FIG. 9, therefore, the pixel data of the frame data F2' outputted from the delay memory 152 is 8 bits wide, and the interpolated frame data F1' created by the interpolation unit 156 is composed of 8-bit data without being subjected to any processing.

Herein, when the frame data F0 is "100h" in 9 bits, the quantization unit 160a discards the lower bit and outputs "80h" corresponding to a half of "100h" as shown in the frame data F0'.

When the frame data F0 is "100h" in 9 bits, the quantization unit 160e discards the lower bit irrespectively of the value thereof before the frame data F0 is held in the delay memory 152.

Accordingly, when the interpolation frame data F1' created by the interpolation unit 156 is "80h" in 8 bits, which corresponds to "100h" in 9 bits, as the frame data Fout, in which the frame data F0' and the interpolated frame data F1' are alternately outputted on a predetermined time unit basis from the frame memory 158, "80h" is successively outputted.

When the frame data F0 is "101h" in 9 bits, the lower bit thereof is "1". Accordingly, the quantization unit 160a carries the lower bit "1" to the higher-order bit and outputs "81h", and the quantization unit 160e discards the lower bit. The interpolated flame data F1' is therefore "80h".

At this time, as the frame data Fout, in which the frame data F0' and the interpolated frame data F1' are alternately outputted from the frame memory 158 on a predetermined time unit basis, "81h" and "80h" are alternately outputted as shown in FIG. 9. The user alternately sees the "81h" and "80h" to visually sense the same as "80.8h", which corresponds to a half of "101h" in 9 bits, as an average for 1/60 seconds.

In the second embodiment, similarly to the first embodiment, based on the premise of execution of the frame-rate increasing process using the interpolation unit 156, the FRC process is applied to the frame data whose frame rate is converted to a higher rate, so that the lower bit deleted by quantization is represented by the higher-order bits of plural frames.

However, there is a time difference of about 1/120 seconds between the time when the lower bits deleted by the quantization unit 160e is represented by higher-order bits and the time when the lower bits deleted by the quantization unit 160a is represented by higher-order bits.

Also in the second embodiment, it is possible to express gray levels equivalent to those of 9-bit pixel data although the number of bits is compressed to 8 bits.

According to the second embodiment, it is possible to reduce the moving picture blurring due to the hold-type display while increasing the gray levels without casually increasing the number of bits. According to the second embodiment, it is possible to avoid an increase in capacity of the frame memory and prevent the cost from increasing by adding memory. Furthermore, according to the second embodiment, it is possible to prevent an increase in power and prevent an increase in cost for measures against heat generation and the power supply circuit due to increasing power.

As for the time difference due to the arrangement of the quantization units 160, the lower bits have lower sensitivity and have less importance to very dynamic moving pictures which are affected by the time difference. Therefore, the time difference has very little substantial influence. In the second embodiment, it is possible to avoid an increase in capacity of even the delay memory 152. The second embodiment has significant cost advantages.

(Third Embodiment: Video Control Device 410)

A third embodiment is an application of the second embodiment to the example described using FIG. 5 in the first embodiment in which the lower 2 bits are deleted. Accordingly, the increase in capacity of the delay memory 152 can be also avoided in addition to the frame memory 158.

Figure 10:
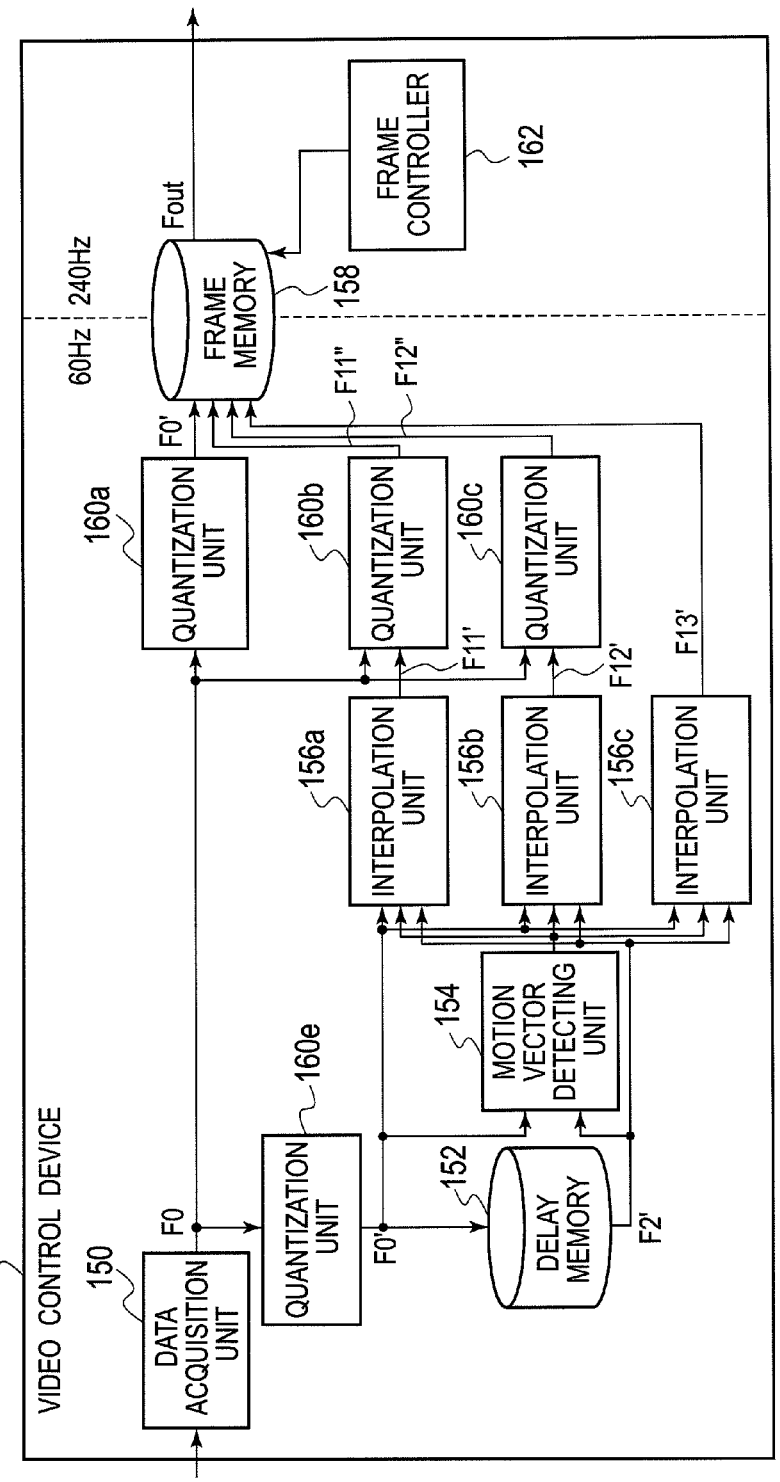
FIG. 10 is a functional block diagram schematically illustrating a video control device of a third embodiment.

FIG. 10 is a functional block diagram schematically illustrating a video control device 410 in the third embodiment. As shown in FIG. 10, the video control device 410 includes a data acquisition unit 150, a delay memory 152, a motion vector detecting unit 154, interpolation units 156a, 156b, and 156c, a frame memory 158, quantization units 160a, 160b, and 160c, and 160e, and a frame controller 162.

In FIG. 10, the quantization units 160a, 160b, and 160c function as downstream quantization units, and the quantization unit 160e functions as an upstream quantization unit.

The constituent components of the video control device 410 of the third embodiment have the substantially same functions as the constituent components of FIG. 5 previously described in the first embodiment and are different in only the connections thereof. The overlapping description thereof is then omitted, and only the constituent components having different connections and functions are mainly described.

The video control device 410 shown in FIG. 10 includes three interpolation units 156a, 156b, and 156c and four quantization units 160a, 160b, 160c, and 160e. The number of the upstream quantization unit and one or plural downstream quantization units in total is at least $2^M$ where M is the predetermined number of deleted lower bits. The ratio of the second frame rate to the first frame rate is set to at least $2^M$.

The video control device 410 is capable of quadrupling the frame rate of 60 Hz, that is, to converting to 240 Hz through the three interpolation units 156a to 156c. Accordingly, the number of bits can be deleted by 2 bits ($=\log_2 4$) by the quantization units 160. The four quantization units 160a to 160e use logical formulae different from one another to quantize the lower 2 bits and delete the same.

In the third embodiment, the quantization unit 160e among the four quantization units 160 is provided as the upstream quantization unit to compress the number of bits when the frame data F0 is held in the delay memory 152.

In the case where the data acquisition unit 150 acquires frame data composed of 10-bit pixel data, the quantization unit 160e simply discards the lower 2 bits and stores the frame data F0' composed of 8-bit pixel data in the delay memory 152.

However, the interpolated frame data F11' and F12' are already composed of 8-bit units by the quantization unit 160e and have lost information of the lower 2 bits. In the third embodiment, therefore, the quantization units 160b and 160c respectively provide the lower 2 bits of the frame data F0 on the LSB side of the 8-bit interpolated frame data F11' and F12' and combine the interpolated frame data F11' and F12' and the lower 2 bits of the frame data F0 into 10-bit data for quantization.

The three quantization units 160a, 160b, and 160c as the downstream quantization units other than the quantization unit 160e add "1" to the third lower bit of the frame data F0 or interpolated frame data F11' and F12' only when a carry occurs in the addition of different numerals "11", "01", and "10" to the lower 2 bits of the frame data F0.

In such a manner, the quantization units 160b and 160c perform quantization as described above after receiving information of the lower 2 bits from the frame data F0. The quantization unit 160e always discards the lower 2 bits as described above.

The reason for not providing a quantization unit downstream of the interpolation unit 156 is as follows. As described in FIG. 5, the quantization unit 160d in downstream of the interpolation unit 156c performs the process of adding "00" to the interpolation frame data F13 and deleting the lower 2 bits. In other words, the quantization unit 160d directly outputs the 8-bit interpolated frame data F13. In FIG. 10, the frame data F0' outputted from the quantization unit 160e is already 8-bit data. Therefore the interpolated frame data F13' can be directly inputted to the frame memory 158.

Figure 11:
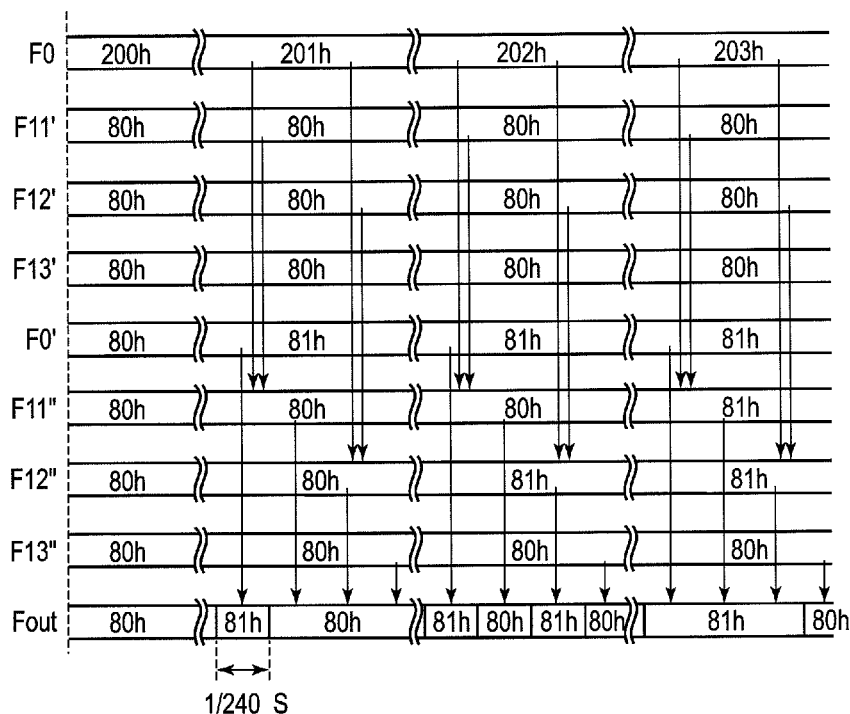
FIG. 11 is an explanatory view for explaining temporal change in data quantized by quantization units.

FIG. 11 is an explanatory view for explaining temporal changes in data quantized by the quantization units 160.

In the case where the video control device 410 shown in FIG. 10 is operated, as shown in FIG. 11, when the frame data F0 is "200h", the interpolated frame data F11', F12', and F13' are "80h", which correspond to "200h". It is assumed that the frame data F0 changes like "201h", "202h", and then "203h".

The lower 2 bits then change like "0h", "1h", "2h", and "3h", and as the frame data Fout, in which the frame data F0' and the interpolated frame data F11' to F13' are repeatedly sequentially outputted on a predetermined time unit basis from the frame memory 158, "81h" and "80h" are alternated as shown in FIG. 11.

The user alternately sees the "81h" and "80h" to visually sense the same as "80.0h", "80.4h", "80.8h", and "80.Ch", which are respectively correspond to a fourth of "200h", "201h", "202h", and "203h", as averages for 1/60 seconds. In other words, according to the third embodiment, it is possible to provide an FRC effect for two bits.

(Forth Embodiment: Video Control Device 510)

In the above-described first embodiment, the number of the quantization units 160 in total is at least $2^M$ where M is the number of deleted lower bits. In the fourth embodiment, the number of deleted lower bits is increased without changing the frame rate.

Figure 12:
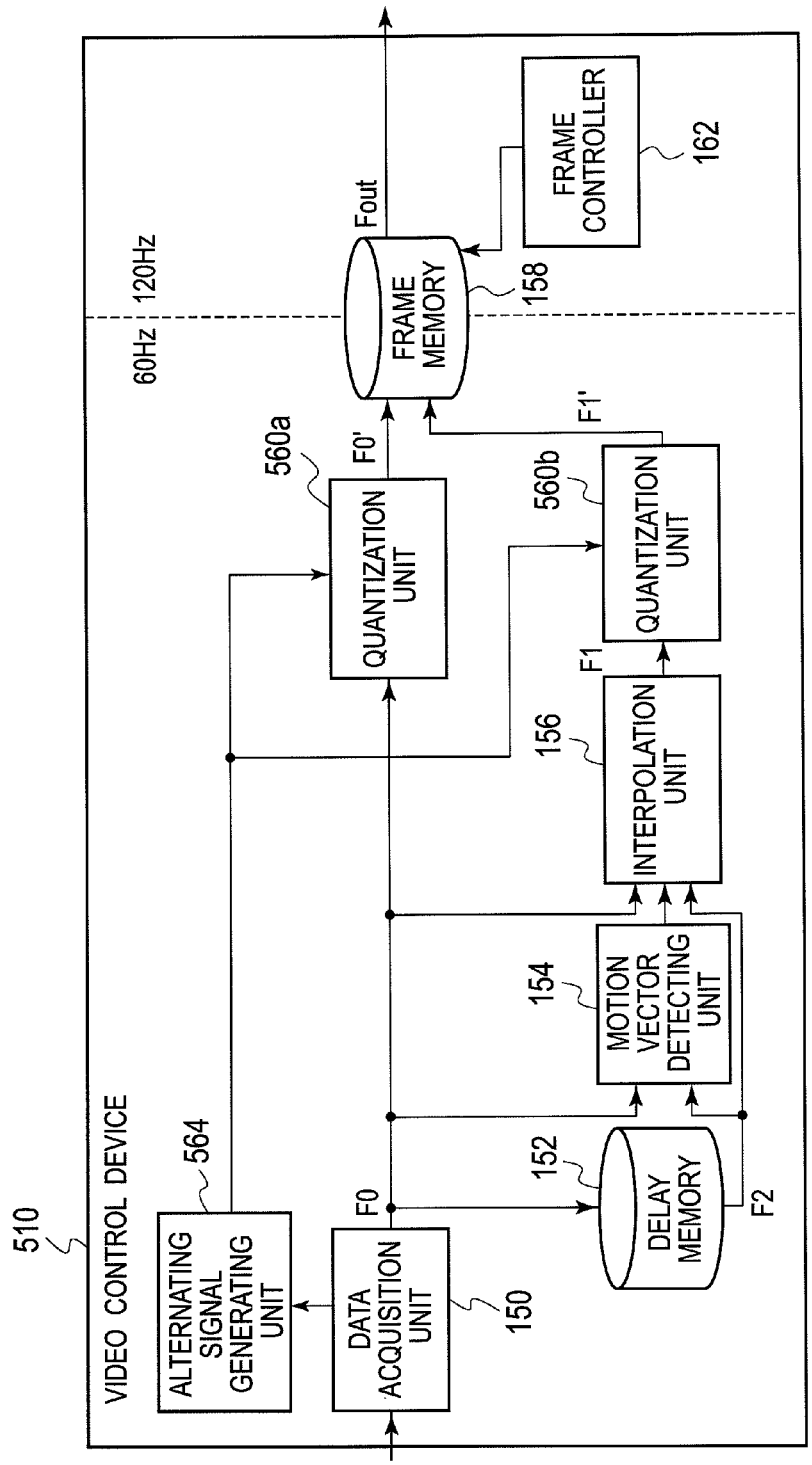
FIG. 12 is a functional block diagram schematically illustrating a video control device of a fourth embodiment.

FIG. 12 is a functional block diagram schematically illustrating a video control device 510 in the fourth embodiment.

As shown in FIG. 12, the video control device 510 includes a data acquisition unit 150, a delay memory 152, a motion vector detecting unit 154, an interpolation units 156, a frame memory 158, a frame controller 162, an alternating signal generating unit 564, quantization units 560a and 560b. The quantization units 560a and 560b are collectively referred to as quantization units 560 in some cases.

The constituent components of the video control device 510 of the fourth embodiment have the substantially same functions as the constituent components previously described in the first embodiment, and the overlapping description thereof is then omitted. Hereinbelow, only the alternating signal generating unit 564 and quantization units 560 having different configurations are mainly described.

With reference to the first frame rate, at which the data acquisition unit 150 acquires frame data, herein 60 Hz, the alternating signal generating unit 564 generates alternating signal including "0"s and "1"s alternating at the first frame rate and sends the same to the quantization units 560a and 560b. When a later-described numeral L (L is a positive integer) is not less than 2, the alternating signal should provide $2^L$ states according to the numeral L.

The quantization units 560a and 560b each include 2L different logical formulae and change the logical formulae at the first frame rate according to the alternating signal. This provides the FRC process with a cycle of 2L frames.

Herein, as for the 2L logical formulae included by each quantization unit 560, L further corresponds to the number of bits deleted in the fourth embodiment, and when the number of quantization units 560 in total is $2^M$, L takes a value of (the number of deleted bits −M).

Accordingly, for example, in the case where the frame data F0 composed of 10-bit pixel data is acquired, in addition to the lower 1 bit deleted in the first embodiment, the lower 1 bit is further deleted in each of the quantization units 560a and 560b. By deleting two bits in total, frame data composed of 8-bit pixel data can be formed.

Specifically, the quantization unit 560a performs a process of adding different numerals "11" and "10" to the lower 2 bits of the frame data F0 and further deleting the lower 2 bits. The quantization unit 560b performs a process of adding different numerals "01" and "00" to the lower 2 bits and further deleting the lower 2 bits.

For example, the quantization unit 560a adds the numeral "11" to the lower 2 bits of the frame data F0 and further deletes the lower 2 bits while the alternating signal is "0". The quantization unit 560a adds the numeral "10" to the lower 2 bits of the frame data F0 and further deletes the lower 2 bits while the alternating signal is "1".

The quantization unit 560b adds the numeral "01" to the lower 2 bits of the interpolated frame data F1 and further deletes the lower 2 bits while the alternating signal is "0". The quantization unit 560b adds the numeral "00" to the lower 2 bits of the interpolated frame data F1 and further deletes the lower 2 bits while the alternating signal is "1". In other words, the quantization unit 560b discards the lower 2 bits regardless of the value of the lower 2 bits while the alternating signal is "1".

When the pixel data of the frame data F0 and the pixel data of the interpolated frame data F1 are "3FFh", which is the maximum value in 10-bit data, overflow occurs if "1" is added to any bit thereof. In this case, the quantization units 560 perform a limiting process to fix the pixel data to "3FFh".

By using such quantization units 560a and 560b, the number of bits can be further reduced. Based on the premise of execution of the frame-rate increasing process using the interpolation unit 156, the FRC process is applied to the frame data whose frame rate is converted to a higher rate. The lower bits deleted by quantization of the quantization units 560a and 560b are represented by the higher bits of plural frames.

Figure 13:
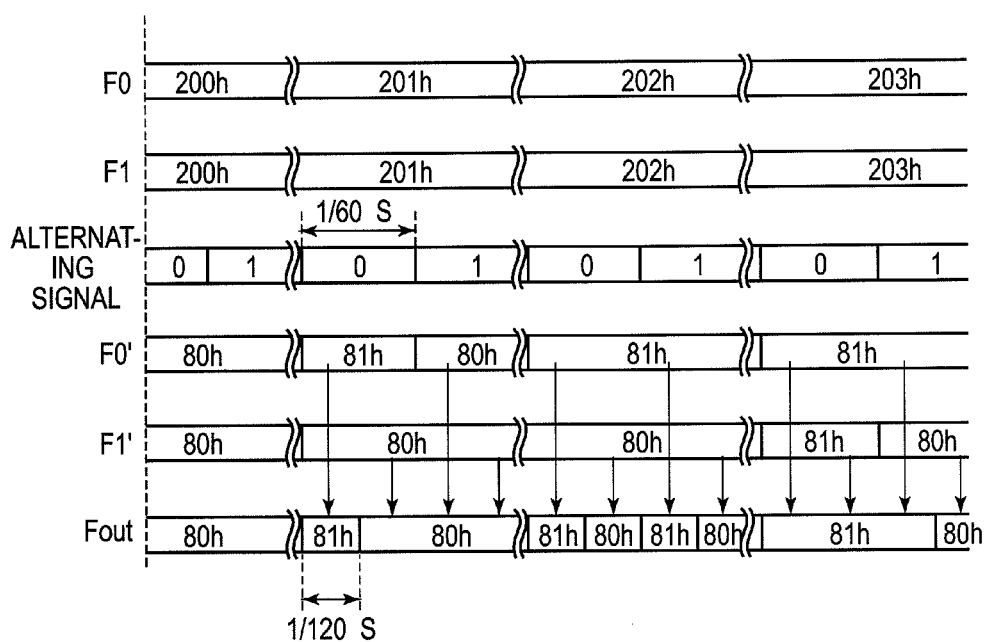
FIG. 13 is an explanatory view for explaining temporal change in data quantized by quantization units.

FIG. 13 is an explanatory view for explaining temporal changes in data quantized by the quantization unit 560.

It is assumed that the frame data F0 and interpolated frame data set F1 both individually change like "200h", "201h", "202h", and then "203h", that is, the lower 2 bits thereof change like "0h", "1h", "2h", and then "3h".

Herein, as shown in FIG. 13, the quantization units 560a and 560b respectively generate the frame data F0' and the plural interpolated frame data F1' composed of 8 bits using the aforementioned different logical formula in response to the alternating signal (at the first frame rate of 60 Hz).

For example, while the alternating signal is "0", the quantization unit 560a outputs "80h" as the frame data F0' only when both of the frame data F0 and interpolated frame data F1 are "200h" and outputs "81h" otherwise.

While the alternating signal is "1", the quantization unit 560a outputs "80h" as the frame data F0' when the frame data F0 and interpolated frame data F1 are both "200h" or "201h" and outputs "81h" when the frame data F0 and interpolated frame data F1 are both "202h" or "203h".

While the alternating signal is "0", the quantization unit 560a outputs "81h" as the interpolated frame data F1' only when both of the frame data F0 and interpolated frame data F1 are "203h" and outputs "80h" otherwise.

While the alternating signal is "1", the quantization unit 560b outputs "80h" independently of the values of the lower 2 bits of the frame data F0 and interpolated frame data F1.

The frame data F0' and interpolated frame data F1' can be thus changed every $1/60$ seconds.

As the frame data Fout, in which the frame data F0' and the interpolated frame data F1' are alternately outputted on a predetermined time unit basis from the frame memory 158, "81h" and "80h" are alternated as shown in FIG. 13.

The user alternately sees the "81h" and "80h" to visually sense the same as "80.0h", "80.4h", "80.8h", and "80.Ch", which are respectively correspond to a fourth of "200h", "201h", "202h", and "203h", as averages for $1/60$ seconds.

In the fourth embodiment, the FRC period is a period of four frames at 120 Hz, which can cause the problem of flicker. However, there is very little influence concerning the lower bits as described above.

Herein, in order to minimize the flicker, the logical formula are built so that when the frame data F0 and interpolated frame data F1 are both "202h", as the frame data Fout, in which the frame data F0' and the interpolated frame data F1' are alternately outputted on a predetermined time unit basis, "81h" and "80h" are alternated every $1/120$ seconds.

The different logical formulae of the aforementioned quantization units 560a and 560b described above can be variously built as long as the frame data Fout is alternated and are not limited to the aforementioned example.

In the fourth embodiment, it is possible to reduce the moving picture blurring due to the hold-type display while increasing the number of gradations without increasing the number of bits. According to the fourth embodiment, the number of bits can be further reduced compared with the first embodiment. It is therefore possible to avoid an increase in capacity of the frame memory 158 and prevent an increase in cost.

When the frame data F0 and interpolated frame data F1 are both "200h" and "202h", flicker can be avoided as shown in FIG. 13. Accordingly, even in the case where the problem of flicker occurs throughout the entire period, there are very few opportunities (frequencies) thereof.

Furthermore, even if flicker is included in the frame data Fout, the flicker can be avoided by spatial dithering in the following step.

The following shows an application example of the fourth embodiment. For example, when the number of bits of pixel data of acquired video signal is known and the number of bits of pixel data held in the frame memory 158 is determined, the difference therebetween is the number of bits to be deleted. From the number of bits to be deleted, the number of bits which can be covered by the rate increasing converter is subtracted. The remaining bits are addressed by increasing the number of frames in a cycle within the quantization unit 560 by the number of the remaining bits.

For example, in the case where the pixel data of the acquired video signal is 11 bit data and is held in the frame memory in 8 bits, if the frame rate can be quadrupled, first, two bits are covered by four ($2^2$) quantization units 560. The residual one bit is addressed by the FRC process of two frames at the first frame rate within the quantization units 560.

By applying the first and fourth embodiments, it is possible to address various bit operations.

(Fifth Embodiment: Video control device 610)

The fifth embodiment is an application of the second embodiment to the example described in the fourth embodiment in which the lower 2 bits are deleted. According to the fifth embodiment, therefore, it is possible to avoid an increase in capacity of the delay memory 152 in addition to the frame memory 158.

Figure 14:
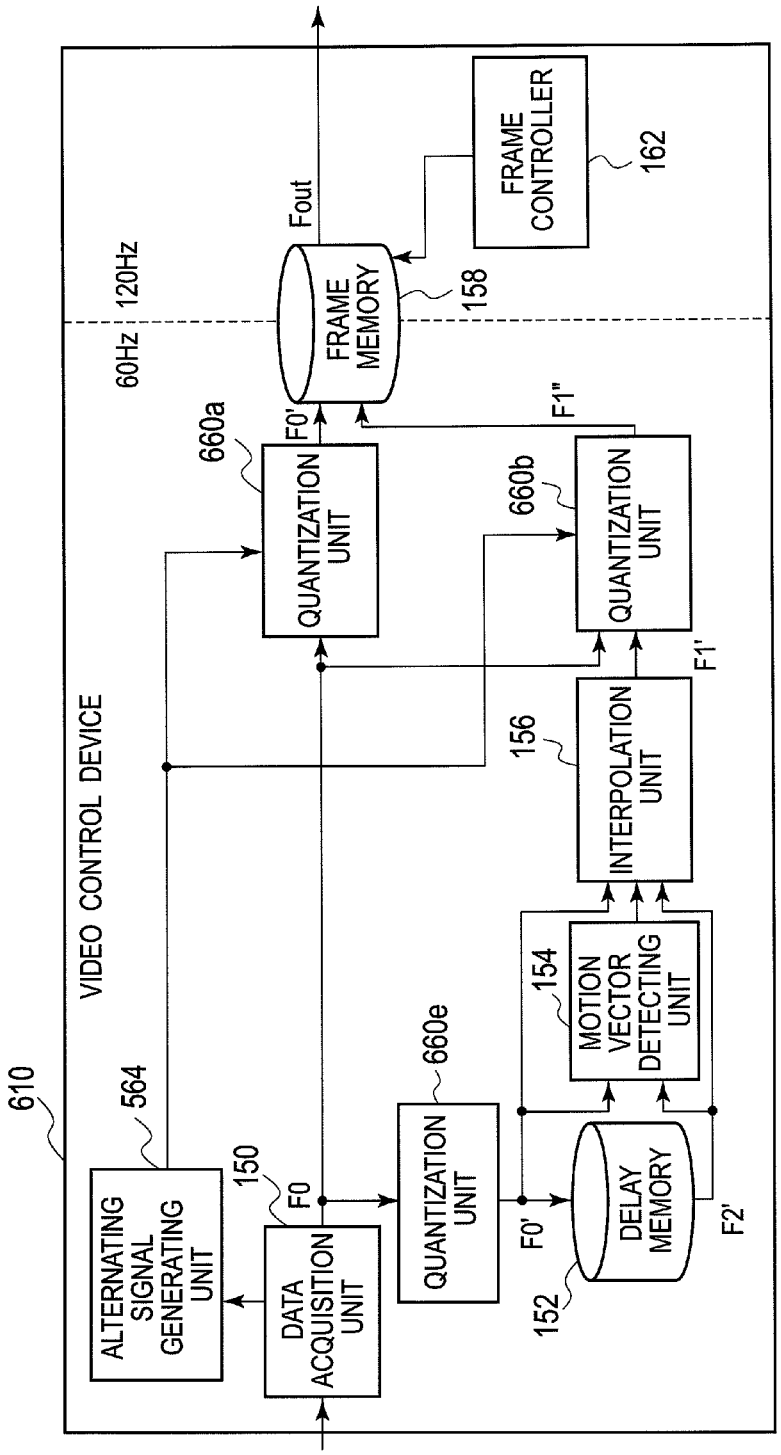
FIG. 14 is a functional block diagram schematically illustrating a video control device of a fifth embodiment.

FIG. 14 is a functional block diagram schematically showing the functions of a video control device 610 of the fifth embodiment.

As shown in FIG. 14, the video control device 610 includes a data acquisition unit 150, a motion vector detecting unit 154, an interpolation unit 156, a frame memory 158, quantization units 660a, 660b, and 660e, and a frame controller 162. The quantization units 660a, 660b, and 660e are collectively referred to as quantization units 660.

In FIG. 14, the quantization units 660a and 660b function as downstream quantization units, and the quantization unit 660e functions as an upstream quantization unit.

The constituent components of the video control device 610 of the fifth embodiment have the substantially same functions as the constituent components previously described in the fourth embodiment. The overlapping description thereof is then omitted, and the quantization units 660 having different configurations are mainly described herein.

The video control device 610 in FIG. 14 is an application of the configuration of the upstream quantization unit of the second embodiment to the video control device 510 of the fourth embodiment.

The quantization unit 660e as the upstream quantization unit compresses the number of bits of the frame data F0 acquired by the data acquisition unit 150 when the frame data F0 is held in the delay memory 152. In the case where the data acquisition unit 150 acquires frame data composed of 10-bit pixel data, the quantization unit 660e deletes the lower 2 bits and stores the frame data F0' composed of 8-bit pixel data in the delay memory 152.

Similarly to the fourth embodiment, the quantization units 660a and 660b as the downstream quantization units each include $2^L$ different logical formulae and change the logical formulae at the first frame rate according to the alternating signal.

However, the interpolated frame data sets F1' is already composed of 8-bit data by the quantization unit 660e and has lost information of the lower 2 bits. In the fifth embodiment, therefore, the quantization units 660b provides the lower 2 bits of the frame data F0 on the LSB side of the 8-bit interpolated frame data F1' and combine the interpolated frame data F1' and the lower 2 bits of the frame data F0 into 10-bit data for quantization.

Specifically, the quantization unit 660a adds "1" to the third lower bit of the frame data F0 only when a carry occurs in the addition of different numerals "11" and "10" to the lower 2 bits of the frame data F0. The quantization unit 660b adds "1" to the LSB of the interpolated frame data F1' only when a carry occurs in the addition of different numerals "01" and "00" to the lower 2 bits of the frame data F0.

The quantization unit 660b performs quantization after receiving information of the lower 2 bits from the frame data F0, and outputs an interpolated frame data F1".

More specifically, while the alternating signal is "0", the quantization unit 660a adds the numeral "11" to the lower 2 bits of the frame data F0 and deletes the lower 2 bits. While the alternating signal is "1", the quantization unit 660a adds the numeral "10" to the lower 2 bits of the frame data F0 and deletes the lower 2 bits.

While the alternating signal is "0", the quantization unit 660b adds "01" to the LSB of the interpolated frame data F1' only when a carry over to the third lower bit occurs in the addition of a numeral of "01" to the lower 2 bits of the frame data F0.

Herein, it is not necessary to delete the lower 2 bits since the quantization unit 660e has already discards the lower 2 bits.

While the alternating signal is "1", the quantization unit 660b adds a numeral "00" to the lower 2 bits of the frame data F0. This is equivalent to non-execution of any process. Accordingly, while the alternating signal is "1", the quantization unit 660b directly outputs the inputted interpolated frame data F1'.

Figure 15:
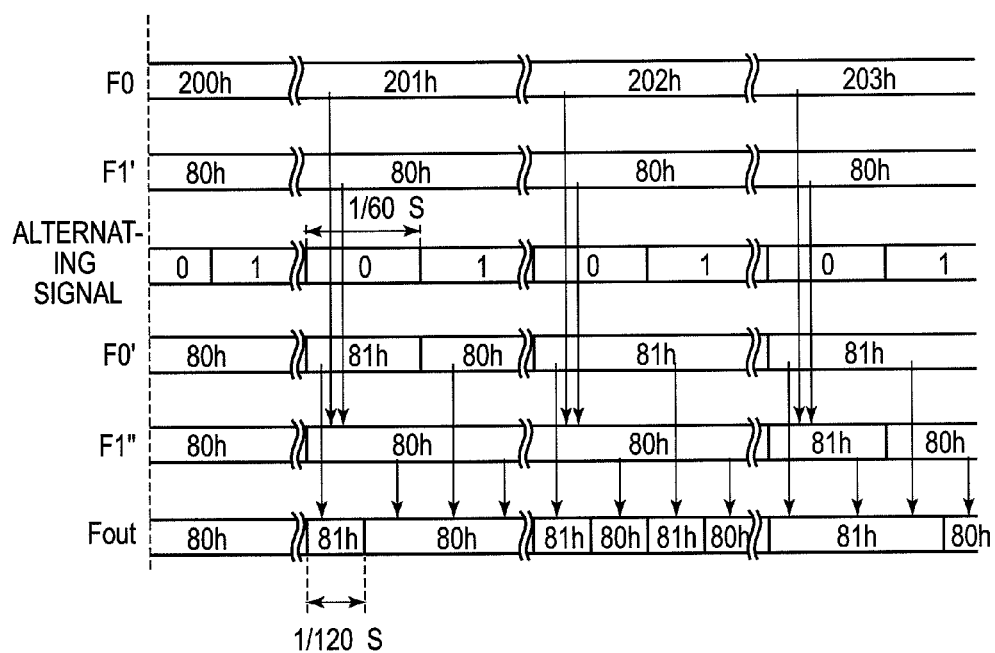
FIG. 15 is an explanatory view for explaining temporal change in data quantized by quantization units.

FIG. 15 is an explanatory view for explaining temporal changes in data quantized by the quantization units 660.

As shown in FIG. 15, when the frame data set F0 individually changes like "200h", "201h", "202h", and then "203h", as the frame data Fout, in which the frame data F0' and the interpolated frame data F1" are alternately outputted on a predetermined time unit basis from the frame memory 158, "81h" and "80h" are alternated similarly to FIG. 13.

The user alternately sees the "81h" and "80h" to visually sense the same sequentially as "80.0h", "80.4h", "80.8h", and "80.Ch", which are respectively correspond to a fourth of "200h", "201h", "202h", and "203h".

However, in the fifth embodiment, similarly to the fourth embodiment, the FRC period is a period of four frames at 120 Hz, which can cause the problem of flicker. However, there is very little influence concerning the lower bits as described above.

According to the fifth embodiment, it is possible to reduce the moving picture blurring due to the hold-type display and increase the number of gray levels without casually increasing the number of bits. According to the fifth embodiment, the number of bits can be further reduced compared with the first embodiment. Accordingly, it is possible to avoid an increase in capacity of the frame memory 158 and prevent an increase in cost. According to the fifth embodiment, it is possible to prevent an increase in power and prevent an increase in cost for measures against heat generation and the power supply circuit with increasing power.

When the frame data F0 and interpolated frame data F1 are both "200h" or "202h", flicker can be avoided as shown in FIG. 15. Accordingly, even in the case where the problem of flicker occurs in the entire period, there are very few opportunities (frequencies) thereof.

Furthermore, even if flicker is included in the frame data Fout, the flicker can be avoided by spatial dithering in the following step.

Hereinabove, the preferred embodiments of the present invention are described with reference to the attached drawings, but it will be obvious that the present invention is not limited to the embodiments. It will be apparent that those skilled in the art can achieve various alternations and modifications within the scope described in claims, and it is understood that the alterations and modifications are within the technical scope of the present invention.

The steps of the video control method of the specification are not necessarily performed chronologically in the order described in the flowcharts and may be performed in parallel or include sub-routine processes.

The present invention is applicable to video control devices and video control methods chancing the frame rate.

What is claimed is:

1. A video control device for a hold-type display, comprising:
   a data acquisition unit configured to acquire first frame data having a first frame rate;
   a first quantization unit configured to quantize data of each pixel constituting the first frame data by a first logical formula to generate a second frame data with a predetermined number of lower bits deleted;
   a delay memory configured to temporarily hold the second frame data and output third frame data obtained by delaying the second frame data;
   one or a plurality of interpolation units configured to generate one or a plurality of sets of interpolated frame data located between adjacent frames in the second frame data by using the second frame data and the third frame data;
   one or a plurality of second quantization units configured to quantize data of each pixel constituting the first frame data or the interpolated frame data by a second logical formula different from the first logical formula to generate a fourth frame data with a predetermined number of lower bits deleted;

a frame memory configured to temporarily hold the fourth frame data and the interpolated frame data; and a frame controller configured to control reading of the fourth frame data and the interpolated frame data from the frame memory to repeatedly output the fourth frame data and the interpolated frame data sequentially from the frame memory at a second frame rate higher than the first frame rate, wherein the number of the first quantization unit and the second quantization unit in total is at least $2^M$, or the ratio of the second frame rate to the first frame rate is $2^M$, where M is the number of deleted lower bits.

2. The video control device for a hold-type display according to claim 1, further comprising a motion vector detecting unit configured to detect a motion vector using the second frame data and the third frame data and to supply the motion vector to one or the plurality of interpolation units.

3. The video control device for a hold-type display according to claim 1, wherein one of either one second quantization unit or the plurality of second quantization units that quantize data of each pixel constituting the interpolation frame data combines the interpolation frame data and the predetermined number of lower bits of the first frame data before the quantization.

4. The video control device for a hold-type display according to claim 1, wherein the first and second logical formulae are different in conditions for bit carry over.

5. The video control device for a hold-type display according to claim 1, further comprising:
an alternating signal generating unit configured to alternately output a first signal and a second signal, which is obtained by inverting the first signal, according to the first frame rate, wherein
the second quantization unit includes $2^L$ logical formulae as the second logical formulae, L being a positive integer, and changes the second logical formulae according to the first and second signals.

6. A video control device for a hold-type display, comprising:
a data acquisition unit configured to acquire first frame data having a first frame rate;
a delay memory configured to temporarily hold the first frame data and output second frame data obtained by delaying the first frame data;
one or a plurality of interpolation units configured to generate one or a plurality of sets of interpolated frame data located between adjacent frames in the first frame data by using the first frame data and the second frame data;
a plurality of quantization units configured to quantize data of each pixel of the first frame data and data of each pixel of the second frame data with different logical formulae and generate third frame data with a predetermined number of bits deleted;

a frame memory configured to temporarily hold the third frame data;
a frame controller configured to control reading of the fourth frame data from the frame memory to cause the fourth frame data to repeatedly output sequentially from the frame memory at a second frame rate higher than the first frame rate; and
an alternating signal generating unit configured to alternately output a first signal and a second signal, which is obtained by inverting the first signal, in accordance with the first frame rate; wherein
the quantization units each have $2^L$ logical formulae where L is a positive integer and changes the logical formulae according to the first and second signals.

7. The video control device for a hold-type display according to claim 6, wherein the number of the plurality of quantization units in total is at least $2^M$ where M is the number of deleted lower bits.

8. The video control device for a hold-type display according to claim 6, wherein the ratio of the second frame rate to the first frame rate is $2^M$ where M is the number of deleted lower bits.

9. The video control device for a hold-type display according to claim 6, further comprising a motion vector detecting unit configured to detect a motion vector using the first frame data and the second frame data and to supply the motion vector to the plurality of interpolation units.

10. A video control method for a hold-type display, comprising:
acquiring first frame data having a first frame rate;
quantizing data of each pixel constituting the first frame data by a first logical formula to generate a second frame data with a predetermined number of lower bits deleted;
temporarily holding the second frame data and outputting third frame data obtained by delaying the second frame data;
generating one or a plurality of sets of interpolated frame data located between adjacent frames in the second frame data by using the second frame data and the third frame data;
quantizing data of each pixel constituting the first frame data or the interpolated frame data by a second logical formula different from the first logical formula to generate a fourth frame data with a predetermined number of lower bits deleted; and
temporarily holding the fourth frame data and the interpolated frame data in a frame memory and repeatedly outputting the fourth frame data and the interpolated frame data sequentially from the frame memory at a second frame rate higher than the first frame rate,
wherein the ratio of the second frame rate to the first frame rate is $2^M$ where M is the number of deleted lower bits.

* * * * *